F. H. CRAWFORD & M. B. CARMODY.
GAGE FOR DETERMINING THE VELOCITY OF FLUIDS.
APPLICATION FILED JUNE 17, 1908.
945,704.
Patented Jan. 4, 1910.
2 SHEETS—SHEET 2.
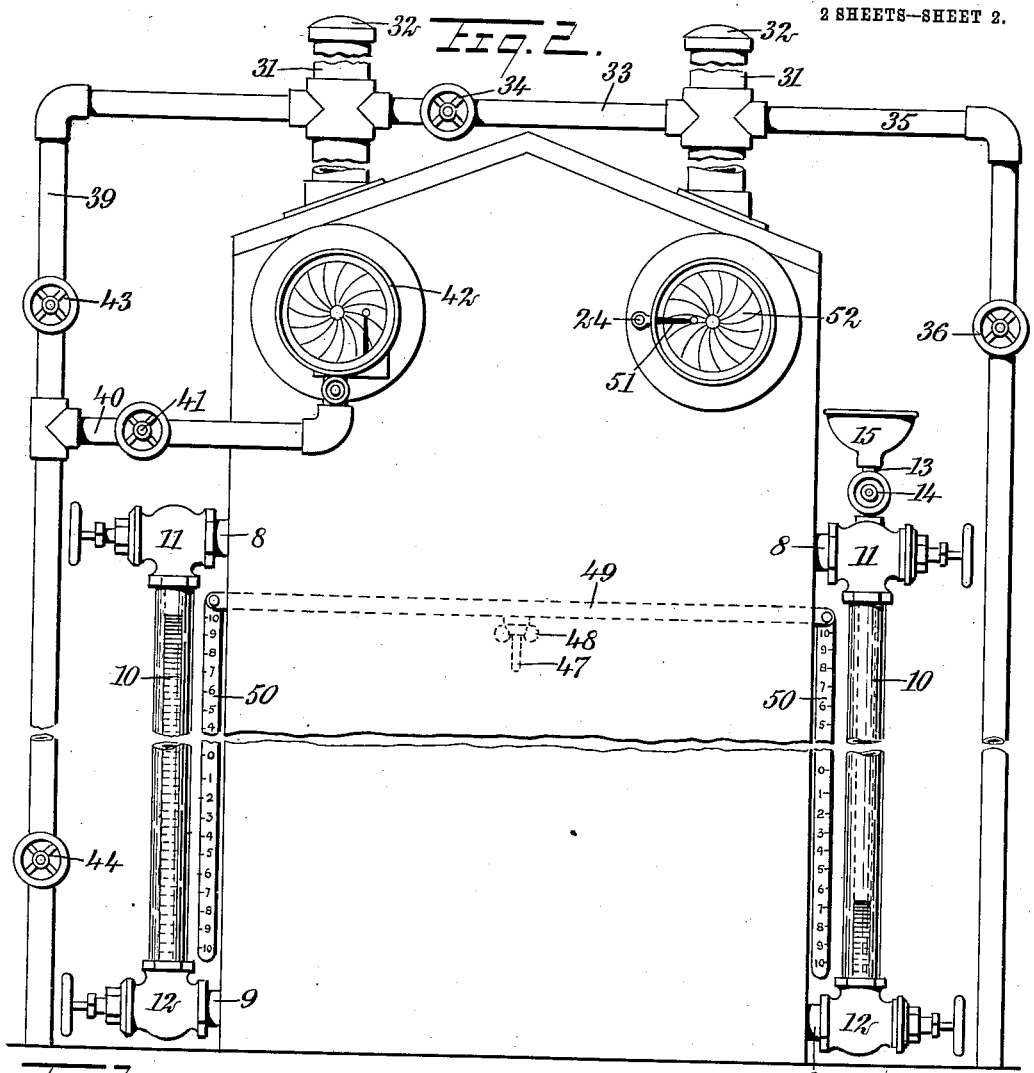
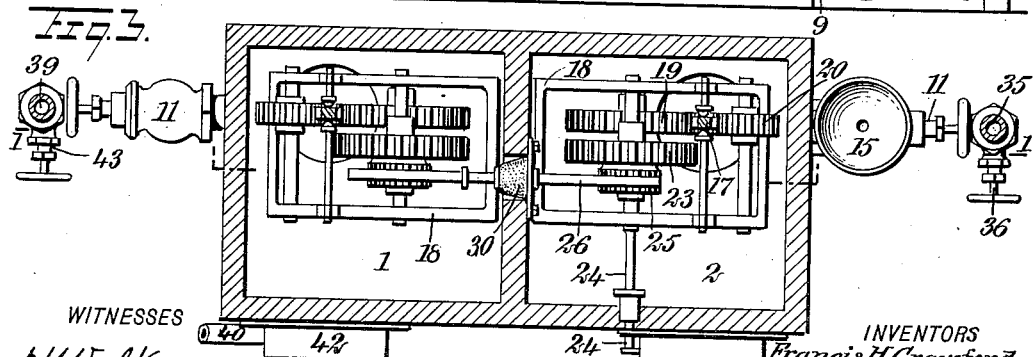
WITNESSES
H. Walker
E. B. Marshall
INVENTORS
Francis H. Crawford
Michael B. Carmody
BY
Munn & Co.
ATTORNEYS

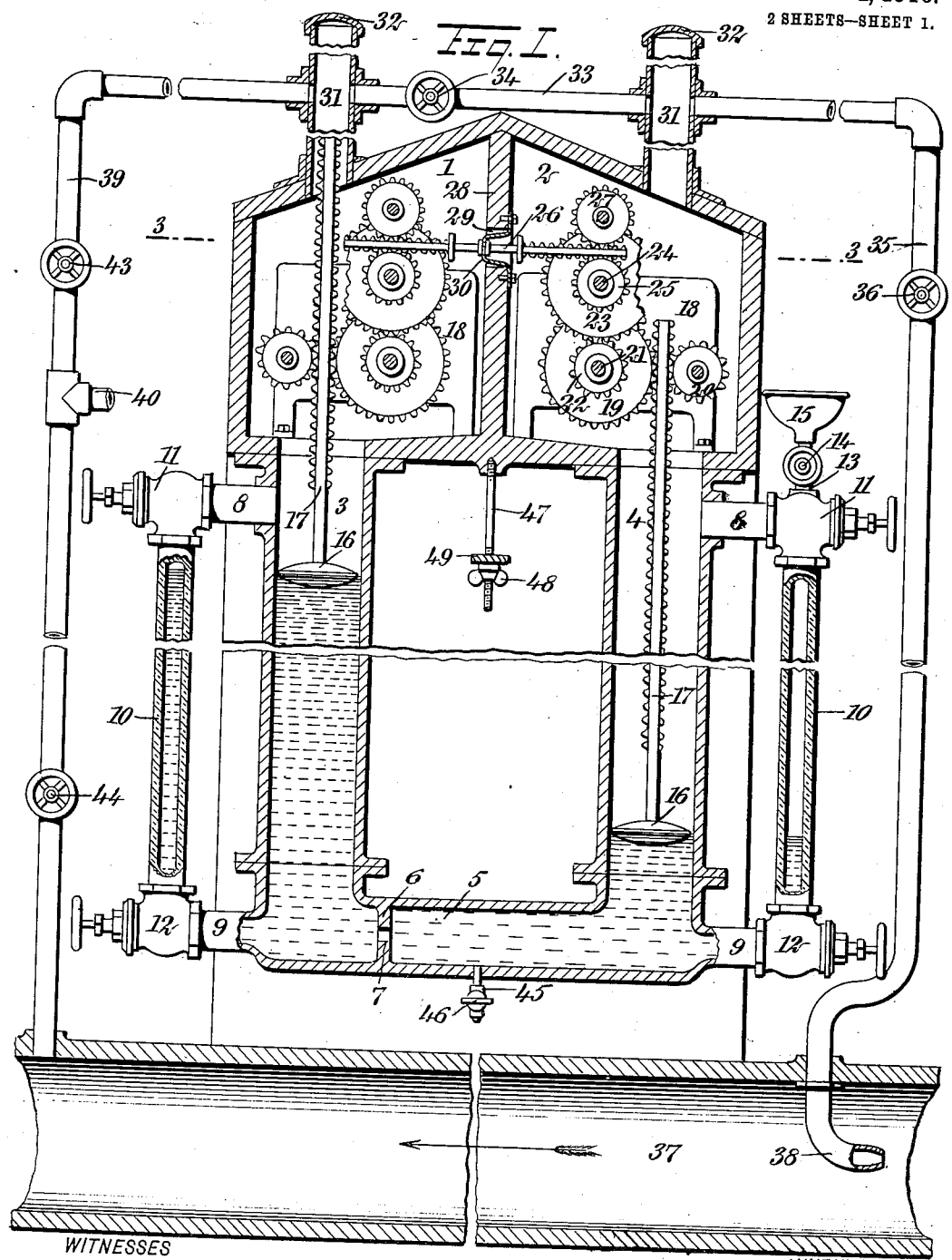

UNITED STATES PATENT OFFICE.

FRANCIS HARVEY CRAWFORD AND MICHAEL BUCK CARMODY, OF COLUMBUS, OHIO.

GAGE FOR DETERMINING THE VELOCITY OF FLUIDS.

945,704.   Specification of Letters Patent.   Patented Jan. 4, 1910.

Application filed June 17, 1908. Serial No. 438,951.

*To all whom it may concern:*

Be it known that we, FRANCIS HARVEY CRAWFORD and MICHAEL BUCK CARMODY, citizens of the United States, and residents of Columbus, in the county of Franklin and State of Ohio, have invented a new and Improved Gage for Determining the Velocity of Fluids, of which the following is a full, clear, and exact description.

The invention consists of a gage, one half of which is subject to the statical pressure and the other half is subject to the statical pressure plus the pressure created by the velocity of the fluid, this pressure being transmitted to the second half of the gage by means of a Pitot's tube. The two halves of the gage are connected at the bottom and the lower portions of the gage are filled with a fluid up to a certain point, floats being supported on the fluid in each half of the gage and rack-arms being secured to the floats respectively, the rack-arms actuating gearing respectively, the gearing of the two halves of the gage being connected. It will thus be seen that the fluid in one-half of the gage will be forced downwardly by the difference in pressure in the two halves of the gage, and that the movement of the fluid from one half of the gage to the other, will be proportional to the pressure exerted by the velocity of the fluid in the main. The velocity of the fluid may, therefore, be ascertained, with a knowledge of the statical pressure in one half of the gage, by determining the variation of the levels in the two halves of the gage, which can readily be determined by the examination of a dial, over which travels a hand which is secured to the gearing. A scale and glass tubes are also provided for use when placing the fluids in the lower portion of the gage.

In this specification we will describe the preferred form of our invention, but it will be understood that we do not limit ourselves thereto, as we consider ourselves entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a sectional view on the line 1—1 of Fig. 3; Fig. 2 is an elevation of the outside of the gage, and Fig. 3 is a sectional plan view on the line 3—3 of Fig. 1.

By referring to the drawings, it will be seen that the gage is divided into two compartments 1 and 2, and that each of these compartments has its lower portion formed in the shape of cylinders 3 and 4 respectively; these cylinders 3 and 4 being connected at their lower terminals by a pipe 5, in which there is a partition 6 having an orifice 7. Each of the cylinders 3 and 4 has pipes 8 and 9 extending therefrom, these pipes being connected with glass tubes 10 which are adapted to show the level of the fluid in the cylinders 3 and 4. These glass tubes 10 may be cut off from the cylinders 3 and 4 by means of valves 11 and 12. Connected with one of these valves 11, is a pipe 13, commanded by a valve 14 and having a cup 15 at its upper terminal, this cup 15 being adapted to receive the fluid which is to be poured into the cylinders 3 and 4 and glass tube 10. In each of the said cylinders 3 and 4 are floats 16, and these floats have secured thereto rack arms 17 which extend upwardly above the cylinder. In these compartments are frames 18, in which are mounted gearing which is identical in both of the compartments, and consists of a crown wheel 19, which meshes with the rack teeth on the rack arm 17, the rack being held close to this crown wheel 19 by means of an idle pinion 20. On the shaft 21 to which the crown wheel 19 is secured, there is also secured a pinion 22, which meshes with a crown wheel 23, secured to a shaft 24, to which a pinion 25 is also secured. This pinion 25 meshes with the rack teeth on a rack-arm 26, the rack teeth being held close to the pinion 25 by means of an idle-pinion 27. As stated, this gearing is journaled in the frame 18 and the gearing in the opposite compartment is similarly secured and is composed of the similar members. The rack-arm 26 passes through a partition 28 which divides the compartments 1 and 2, and in the opening 29 of the said partition 28, there is secured a diaphragm 30, to which the rack-arm 26 is secured. The communication between the diaphragm 30 and the partition 28 and also the communication between the said diaphragm and the rack-arm 26 are such as to prevent the flow of any fluid under pressure from one compartment to the other.

At the top of each of the compartments 1 and 2 are disposed pipes 31 which are in communication with the said compartments respectively. These pipes extend upwardly for a distance and have secured at their upper ends crowns 32, which inclose the upper terminals of the said pipes. The pipes 31 are so disposed above the rack-arms 17 that the rack-arms may extend upwardly above the top of the compartments 1 and 2. The two pipes 31 are connected by means of a pipe 33, in which there is a valve 34, and the pipe 31 above the compartment 2 is also in communication with a pipe 35, having a valve 36 therein, this pipe 35 extending down into the main 37 and having at its lower terminal a Pitot's tube 38, which is oppositely disposed to the flow of the fluid in the said main 37, this being familiar to those acquainted with the practice in the art. The pipe 31 above the compartment 1 is connected by means of a pipe 39, to the main 37. In this pipe there is a branch 40, having a valve 41 therein, which branch 40 communicates with a pressure gage 42, which is adjusted in any customary manner. Between this branch 40 and the pipe 31, there is in the pipe 39, a valve 43 and also, between the branch 40 and the main 37, there is another valve 44 in the said pipe 39. At the bottom of the communicating pipe 5, between the cylinders 3 and 4, there is a trend 45 which is commanded by a cock 46. Between the cylinders 3 and 4 and approximately immediately below the partition 28, between the said compartments, there is secured a vertically disposed rod 47 having a thread at its lower terminal and a thumbscrew 48 engaging therewith. To this rod is secured a transverse member 49 which is held at the desired height by means of the thumbscrew 48, and to the terminals of the transverse member 49 are secured scales 50, these scales being disposed near the glass tubes 10, so that the amount of fluid which is being introduced into the cylinders 3 and 4 may be quickly ascertained. The shaft 24 to which the pinion 25 and the crown wheel 23 are secured, extends through the front of the compartment 2. The connection between the said shaft 24 and the front of the compartment is such as to prevent the escape of the gases contained in the said compartment. To this shaft 24 is secured, outside of the said compartment, an arm 51 which is disposed in front of a dial 52.

In using our invention, the valve 14 is opened and a suitable fluid is poured into the cup 15, the fluid flowing through the pipes 13 and 8 into the cylinder 4 and from thence into the companion cylinder 3. This fluid may be water, but when the pressure is very great the use of mercury is preferable, because of its specific gravity. By means of the scales 50 and the glass tubes 10, the height of the fluid in the cylinders 3 and 4 is determined, and when the cylinders are about half filled, the supply is cut off and the valve 14 is closed. The valves 11 and 12 may also now be closed if desired. The Pitot's tube being properly adjusted in the main 37 and the pipe 39, in which the statical pressure in the main 37 is indicated, also being adjusted and connected to the main, the gage 42 will determine the statical pressure in the main 37 at all times, and this pressure will be that which is exerted within the compartment 1 and against the upper side of the float 16 in the cylinder 3. The pressure in the compartment 2 and against the upper side of the float 16 in the cylinder 4 will be the statical pressure, plus the pressure exerted by the velocity of the fluid in the main 37; and it will, therefore, be seen that the pressure in the compartment 2 and in its cylinder 4 will be greater than the pressure in the compartment 1 and in its cylinder 3, and that this greater pressure in the cylinder 4 will force the fluid in the said cylinder 4, downwardly, the fluid passing through the orifice in the partition 6 and into the cylinder 3, and at all times when the fluid is flowing in the main 37, the level of the fluid in the cylinder 4 will be lower than the level of the fluid in the cylinder 3. It will also be seen that as the velocity of the fluid in the main 37 increases, the pressure in the cylinder 4 will increase proportionately, which will cause the fluid in the cylinder 4 to pass therefrom, into the cylinder 3, in proportion to the said increase in pressure. As the pressure in the cylinder 4 exceeds the pressure in the cylinder 3 because of the velocity of the fluid in the main 37, the float 16 in the said cylinder 4 will descend with the fluid and will carry downwardly therewith, the rack-arm 17, the movement of which will operate the gearing journaled in the frame 18, which will cause the shaft 24 to rotate, carrying therewith the arm 51, which will indicate the movement to the operator at the outside, on the gage 52. As the float 16 in the cylinder 4 descends, the float 16 in the cylinder 3 will ascend, carrying therewith the rack-arm 17 secured thereto, which will give a contrary movement to the gearing in the compartment 1 to that of the gearing in the compartment 2, when the float 16 in the cylinder 4 descends. This contrary movement will cause the rack-arm 26 to be drawn into the compartment 1 for a distance, and during this operation the movement of the gearing in the compartment 2 will also cause the said rack-arm 26 to move into the compartment 1. It will, therefore, be seen that not only will the float 16 in the cylinder 4 operate the gearing which controls the movement of the arm 51 passing in front of the dial 52, but also that the float 16 in the cylinder 3 will, by means of the gearing in the compartment 1, and of the rack-arm 26, operate the said arm 51, and that the gearing in the respective compartments 1 and 2, will be operated in unison by the variation of the level of the fluid in the cylinders 3 and 4. The operator may, by examining the hand 51, with reference to the dial 52, ascertain quickly the relative positions of the floats 16 in the cylinders 3 and 4, and with this information and a knowledge of the specific gravity of the fluid contained in the said cylinder, he can quickly determine the excess of pressure in the compartment 2 over the pressure in the compartment 1, and this excess of pressure will determine the velocity of the flow of the fluid in the main 37. When desired, the operator may refer to the gage 42, to ascertain the statical pressure in the main to assist in determining the velocity of the fluid.

Having thus described our invention, we claim as new and desire to secure by Letters Patent:

1. In a gage for determining the velocity of fluids in mains, two compartments, communicating means between the compartments, a fluid in the compartments, floats in the compartments respectively, rack arms secured to the floats, gearing in the compartments respectively, and a member adapted to move longitudinally connecting the two sets of gearing, and a pressure tight member in the wall separating the compartments through which the member is disposed.

2. In a gage for determining the velocity of fluids in mains, two compartments, the partition between the compartments being provided with an opening communicating means between the compartments, a fluid in the compartments, floats in the compartments respectively, rack arms secured to the floats, gearing in the compartments respectively, the rack arms connecting the floats and the gearing respectively, a member adapted to move longitudinally connecting the two sets of gearing, a diaphragm disposed in the opening in the partition between the compartments, the member being secured to the diaphragm.

3. In a gage for determining the velocity of fluids in mains, two compartments, communicating means between the compartments, a fluid in the compartments, floats in the compartments respectively, rack arms secured to the floats respectively, two shafts in each of the said compartments disposed between the positions occupied by the rack arms when raised and the partition separating the two compartments, gear wheels mounted on one of the shafts respectively, the rack arms engaging the gear wheels respectively, means by which the shafts on which the last-named gear wheels are mounted, are adapted for driving the other shafts respectively, a member adapted for moving longitudinally, means connecting the said member with the last-named shafts, communicating means between one of the compartments and the main, a second communicating means between the other compartment and the main, the second communicating means having a Pitot's tube at its terminal in the main, a hand adapted to indicate the positions of the floats, and means to operate the hand which is adapted to be actuated by the gearing.

4. In a gage for determining the velocity of fluids in mains, two compartments, a communicating means between the compartments, a fluid in the compartments, floats in the compartments respectively, rack arms secured to the floats, gearing in the compartments respectively, the rack arms meshing with members of the gearing in each of the compartments respectively, a pressure tight member in the partition separating the compartments, a rack arm connecting the two sides of the gearing, the last named rack arm passing through the pressure tight member in the partition between the compartments, and idle pinions which are adapted to hold the rack arms close to the gearing.

5. In a gage for determining the velocity of fluids in mains, two compartments, communicating means between the compartments, a fluid in the compartments, floats in the compartments respectively, rack-arms secured to the floats, gearing in the compartments respectively, a rack-arm connecting the two sets of gearing, and a diaphragm in the wall separating the compartments, the diaphragm being secured to said rack-arm connecting the two sets of gearing, there being a pressure-tight connection between the diaphragm and the wall separating the compartments and also between the diaphragm and the rack-arm connecting the two sets of gearing.

In testimony whereof we have signed our names to this specification in the presence of two subscribing witnesses.

FRANCIS HARVEY CRAWFORD.
MICHAEL BUCK CARMODY.

Witnesses:
M. W. VON SCIO,
P. J. LENKART.